(12) United States Patent
Rekeita et al.

(10) Patent No.: US 6,393,508 B2
(45) Date of Patent: May 21, 2002

(54) METHOD AND APPARATUS FOR MULTIPLE TIER INTELLIGENT BUS ARBITRATION ON A PCI TO PCI BRIDGE

(75) Inventors: David W. Rekeita, McKinney; Chen Ding, Sherman; Krunali Patel, Plano, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/796,016

(22) Filed: Feb. 28, 2001

Related U.S. Application Data

(63) Continuation of application No. 09/162,975, filed on Sep. 29, 1998.
(60) Provisional application No. 60/060,467, filed on Sep. 30, 1997.

(51) Int. Cl.[7] ............................ G06F 12/00; G06F 13/14
(52) U.S. Cl. ............................ 710/243; 710/27; 710/36; 710/113; 710/119
(58) Field of Search ............................ 710/27, 36, 113, 710/119, 240–244

(56) References Cited

U.S. PATENT DOCUMENTS

| | | | | |
|---|---|---|---|---|
| 5,265,211 A | * | 11/1993 | Amini et al. | 710/36 |
| 5,276,845 A | * | 1/1994 | Takayama | 710/27 |
| 5,280,623 A | * | 1/1994 | Sodos et al. | 710/113 |
| 5,297,260 A | * | 3/1994 | Kametani | 710/113 |
| 5,297,292 A | * | 3/1994 | Morimoto et al. | 710/113 |
| 5,396,602 A | | 3/1995 | Amini et al. | 710/113 |
| 5,450,551 A | | 9/1995 | Amini et al. | 710/119 |
| 5,790,870 A | | 8/1998 | Hausauer et al. | 710/260 |

* cited by examiner

Primary Examiner—Rupal Dharia
(74) Attorney, Agent, or Firm—W. James Brady; Frederick J. Telecky, Jr.

(57) ABSTRACT

The method of the present invention includes maintaining a first tier 101 and a second tier 102 of devices 30 that have access to a secondary bus 42 that a PCI to PCI bridge 38 services. Each device 30 that has access to secondary PCI bus 42 is categorized into either first tier 101 or a second tier 102. The devices 30 in first tier 101 are provided more frequent opportunities to gain access to secondary PCI bus 42 than devices in low tier 102. Next, a pending transaction is recognized when an initiating device 30 that has been categorized into second tier 102 accesses secondary PCI bus 42 and attempts a transaction that crosses PCI to PCI bridge 38 to primary PCI bus 26. However, PCI to PCI bridge 38 is unable to complete the transaction on primary PCI bus 26. Therefore, PCI to PCI bridge 38 is unable to provide access to any other device 30 on secondary bus 42 until the pending transaction completes. Next, device 30 that initiated the pending transaction is categorized into first tier 101 until the pending transaction is completed.

16 Claims, 6 Drawing Sheets

BRIDGE ARBITRATION REGISTER

| BIT | TYPE | FUNCTION |
|---|---|---|
| 7 | R/W | BUS PARKING BIT. THIS BIT DETERMINES WHERE THE INTERNAL ARBITER WILL PARK THE SECONDARY BUS. WHEN THIS BIT IS SET, THE ARBITER WILL PARK THE SECONDARY BUS ON THE BRIDGE. WHEN THIS BIT IS CLEARED THE ARBITER WILL PARK THE BUS ON THE LAST DEVICE MASTERING THE SECONDARY BUS. THIS BIT IS ENCODED AS:<br>0=PARK THE SECONDARY BUS ON THE LAST SECONDARY BUS MASTER (DEFAULT)<br>1=PARK THE SECONDARY BUS ON THE BRIDGE |
| 6 | R/W | BRIDGE TIER SELECT. THIS BIT DETERMINES IN WHICH TIER THE BRIDGE IS PLACED IN THE TWO-TIER ARBITRATION SCHEME<br>0=LOWEST PRIORITY TIER<br>1=HIGHEST PRIORITY TIER (DEFAULT) |
| 5 | R/W | $\overline{GNT5}$ TIER SELECT. THIS BIT DETERMINES IN WHICH TIER THE $\overline{S\_GNT5}$ IS PLACED IN THE ARBITRATION SCHEME. THIS BIT IS ENCODED AS:<br>0=LOWEST PRIORITY TIER (DEFAULT)<br>1=HIGHEST PRIORITY TIER |
| 4 | R/W | $\overline{GNT4}$ TIER SELECT. THIS BIT DETERMINES IN WHICH TIER THE $\overline{S\_GNT4}$ IS PLACED IN THE ARBITRATION SCHEME. THIS BIT IS ENCODED AS:<br>0=LOWEST PRIORITY TIER (DEFAULT)<br>1=HIGHEST PRIORITY TIER |
| 3 | R/W | $\overline{GNT3}$ TIER SELECT. THIS BIT DETERMINES IN WHICH TIER THE $\overline{S\_GNT3}$ IS PLACED IN THE ARBITRATION SCHEME. THIS BIT IS ENCODED AS:<br>0=LOWEST PRIORITY TIER (DEFAULT)<br>1=HIGHEST PRIORITY TIER |
| 2 | R/W | $\overline{GNT2}$ TIER SELECT. THIS BIT DETERMINES IN WHICH TIER THE $\overline{S\_GNT2}$ IS PLACED IN THE ARBITRATION SCHEME. THIS BIT IS ENCODED AS:<br>0=LOWEST PRIORITY TIER (DEFAULT)<br>1=HIGHEST PRIORITY TIER |
| 1 | R/W | $\overline{GNT1}$ TIER SELECT. THIS BIT DETERMINES IN WHICH TIER THE $\overline{S\_GNT1}$ IS PLACED IN THE ARBITRATION SCHEME. THIS BIT IS ENCODED AS:<br>0=LOWEST PRIORITY TIER (DEFAULT)<br>1=HIGHEST PRIORITY TIER |
| 0 | R/W | $\overline{GNT0}$ TIER SELECT. THIS BIT DETERMINES IN WHICH TIER THE $\overline{S\_GNT0}$ IS PLACED IN THE ARBITRATION SCHEME. THIS BIT IS ENCODED AS:<br>0=LOWEST PRIORITY TIER (DEFAULT)<br>1=HIGHEST PRIORITY TIER |

ALL DEVICES IN LOW TIER

| BRIDGE STATUS | FREE | BUSY | BUSY | BUSY | BUSY | BUSY | BUSY | FREE |
|---|---|---|---|---|---|---|---|---|
| TRANSACTION BY DEVICE 0 | BEGIN | PENDING PRIMARY | COMPLETE PRIMARY | → | → | → | COMPLETE SECONDARY | |
| OPPORTUNITY TO ACCESS | 0 | 1 | 2 | 3 | 4 | 5 | 0 | 1 |
| TIME → | A | B | C | D | E | F | G | H |

DEVICE 0 PLACED IN HIGH TIER THEN RETURNED TO LOW TIER

| BRIDGE STATUS | FREE | BUSY | BUSY | FREE | FREE | FREE | FREE | FREE |
|---|---|---|---|---|---|---|---|---|
| TRANSACTION BY DEVICE 0 | BEGIN | PENDING PRIMARY | COMPLETE PRIMARY AND SECONDARY | | | | | |
| OPPORTUNITY TO ACCESS | 0 | 1 | 0 | 2 | 3 | 4 | 5 | 0 |

METHOD AND APPARATUS FOR MULTIPLE TIER INTELLIGENT BUS ARBITRATION ON A PCI TO PCI BRIDGE

This is a continuation of application Ser. No. 09/162,975, filed Sep. 29, 1998, which claims priority under 35 USC §119(e)(1) of provisional application No. 60/060,467, filed Sep. 30, 1997.

TECHNICAL FIELD OF THE INVENTION

The present invention relates in general to the field of PCI to PCI bridge devices and more specifically to a method and apparatus for intelligent bus arbitration in a PCI to PCI bridge.

BACKGROUND OF THE INVENTION

A peripheral component interconnect (PCI) bridge provides a connection path between two independent PCI buses. The primary function of a PCI to PCI bridge is to allow transactions to occur between a device on one PCI bus and a device on the other PCI bus. System and option card designers can use multiple PCI to PCI bridges to create an hierarchy of PCI buses. This allows system and option card designers to overcome electrical loading limits.

In a transaction between two PCI devices, the PCI device that initiates the transaction is called the master and the other PCI device is called the target. If the master and target are on different PCI buses, the bus that the master resides on is the initiating bus. The bus that the target resides on is the target bus.

A PCI to PCI bridge has two PCI interfaces, each connected to a PCI bus. The PCI interface of the PCI to PCI bridge that is connected to the PCI bus that is closest to the CPU is the primary interface. The PCI interface of the PCI to PCI bridge that is connected to the PCI bus that is farthest from the CPU is the secondary interface. Similarly, the PCI bus that is connected to the primary interface of the PCI to PCI bridge is called the primary PCI bus. The PCI bus that is connected to the secondary interface of the PCI to PCI bridge is called the secondary bus.

A PCI to PCI bridge acts essentially as an intermediary between devices located on the secondary bus and devices that are located on the primary bus. The two interfaces of the PCI to PCI bridge bus are capable of both master and target operations. The PCI to PCI bridge acts as a target on the initiating bus on behalf of the target that actually resides on the target bus. Similarly, the PCI to PCI bridge functions as a master on the target bus on behalf of the master that actually resides on the initiating bus. To devices located on the primary bus, the PCI to PCI-bridge appears as one device where it actually represents several PCI devices that are located on the secondary bus. A detailed specification for PCI to PCI bridges is set forth in "PCI to PCI Bridge Architecture Specification", Revision 1.0, Apr. 5, 1994, PCI Special Interest Group, Hillsboro, Oreg.

Because several PCI devices reside on the secondary bus, it is possible that more than one of these devices will attempt to complete a transaction through the PCI to PCI bridge to a device on the primary bus at the same time. Therefore, it is desirable to have some type of arbitration scheme to decide which device on the secondary bus gets to initiate a transaction.

One such arbitration scheme is a two tier arbitration scheme. In the two tier arbitration scheme, the devices located on the secondary bus are categorized into a high tier and a low tier. Each device in the high tier is given the opportunity to access the secondary bus. Then a single device in the low tier is given the same opportunity. Then each device in the high tier is given another opportunity to access the bus before another device in the low tier is given an opportunity to access the secondary bus. This process is repeated such that devices in the high tier are given more opportunities to access the secondary bus than devices in the low tier.

SUMMARY OF THE INVENTION

In accordance with the present invention, a method and apparatus for multiple tier intelligent bus arbitration on a PCI to PCI bridge is provided that substantially eliminates or reduces problems associated with previously developed PCI to PCI bridge arbitration schemes.

The method of the present invention includes maintaining a first tier and a second tier of devices that have access to the secondary bus that the PCI to PCI bridge services. Each device that has access to the secondary PCI bus is categorized into either the first tier or the second tier. The devices in the first tier are provided more frequent opportunities to gain access to the secondary PCI bus than devices in the low tier. Next, a pending transaction is recognized when an initiating device that has been categorized into the second tier accesses the secondary PCI bus and attempts a transaction that crosses the PCI to PCI bridge to the primary PCI bus. However, the PCI to PCI bridge is unable to complete the transaction on the primary PCI bus. Therefore, the PCI to PCI bridge is unable to provide access to any other device on the secondary bus until the pending transaction completes. Next, the device that initiated the pending transaction is categorized into the first tier until the pending transaction is completed.

An apparatus of the present invention includes a PCI to PCI bridge arbiter operable to execute the two tier intelligent bus arbitration scheme as described in the above method.

A further apparatus of the present invention includes a PCI to PCI bridge with an internal arbiter operable to execute the two tier intelligent bus arbitration scheme as described in the above method.

A technical advantage of the present invention is that the pending transaction will be completed faster because the initiating device is placed into the first tier of high priority devices such that it has more opportunities to access the secondary bus.

Additional technical advantages should be readily apparent from the drawings, description, and claims.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein:

FIG. 4 is a diagram of one embodiment of a bridge arbitration register of a PCI to PCI bridge with a two tier internal arbitration mechanism according to the present invention;

FIG. 7 is a diagram of one embodiment of the activity of a PCI to PCI bridge containing a two tier arbitration scheme with and without an intelligent bus arbitration scheme according to the present invention.

DETAILED DESCRIPTION OF THE INVENTION

Figure 1:
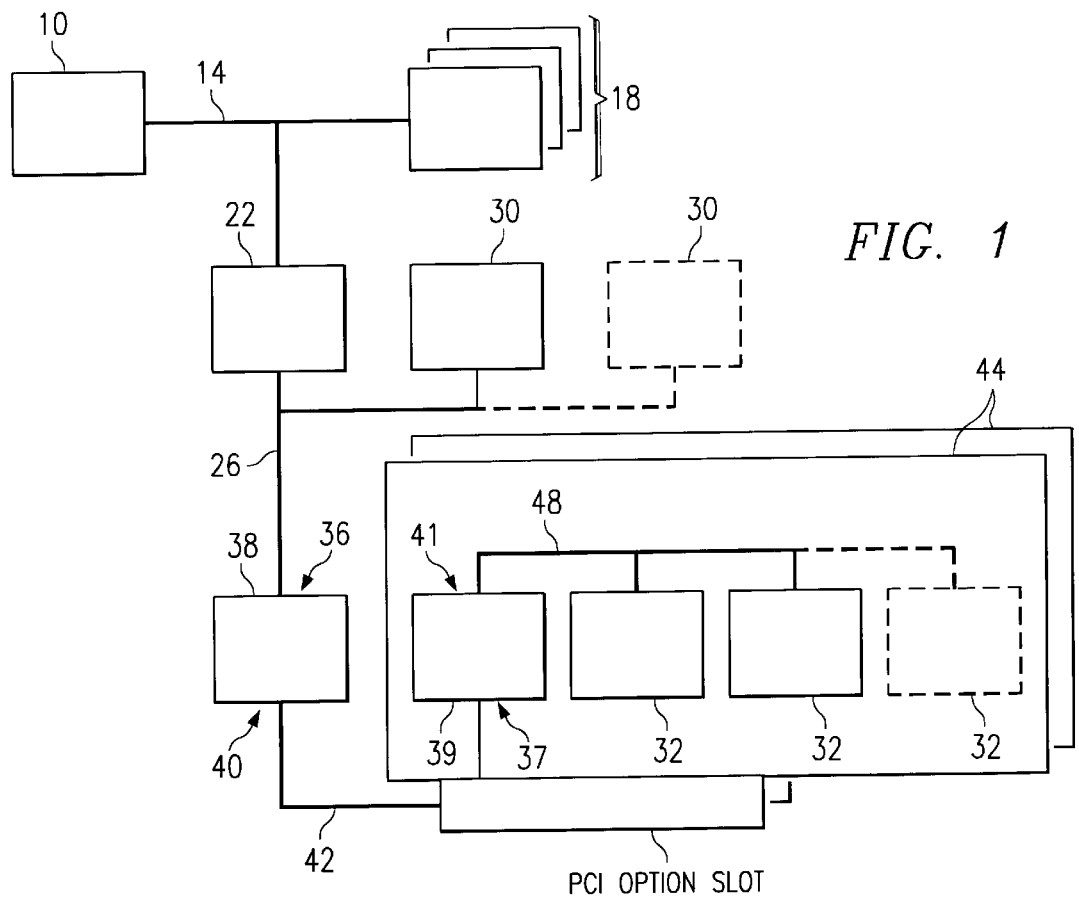
FIG. 1 is a block diagram of typical PCI to PCI bridge applications.

FIG. 1 is a block diagram of typical PCI to PCI bridge applications. A CPU 10 connects to memory 18 via host bus 14. A host bridge 22 connects host bus 14 to a PCI bus 26. PCI bus 26 connects PCI devices 30 to host bridge 22. PCI bus 26 also connects to a PCI to PCI bridge 38. PCI to PCI bridge 38 in turn connects to PCI option cards 44 via PCI bus 42. A second PCI to PCI bridge 39 operates via PCI bus 48 to connect PCI devices 32 to PCI bus 42.

The bus that connects to a PCI to PCI bridge and is closest to the CPU is the primary bus and connects to the primary interface of the PCI to PCI bridge. Therefore, for PCI to PCI bridge 38, interface 36 is the primary interface and PCI bus 26 is the primary bus. Accordingly, interface 40 is the secondary interface and PCI bus 42 is the secondary bus. For PCI to PCI bridge 39, interface 37 is the primary interface and PCI bus 42 is the primary bus, while interface 41 is the secondary interface and PCI bus 48 is the secondary bus.

In a configuration such as that shown in FIG. 1, each PCI to PCI bridge and each PCI bus are numbered for identification. The PCI bus that is the secondary bus for the host bridge is given the name "PCI BUS 0." Therefore, PCI bus 26 is PCI BUS 0. The PCI to PCI bridge that uses PCI BUS 0 as its primary interface is given the name "PCI-PCI BRIDGE 1." This corresponds to PCI to PCI bridge 38. The PCI bus that acts as the secondary bus to a PCI to PCI bridge is given the number of that PCI to PCI bridge. Therefore, PCI bus 42 is called "PCI BUS 1" because it is the secondary bus to PCI-PCI BRIDGE 1 (PCI to PCI bridge 38). Each PCI to PCI bridge and each PCI bus is named in this fashion. Thus, for FIG. 1, PCI to PCI bridge 39 is named "PCI-PCI BRIDGE 2" and PCI bus 48 is "PCI BUS 2."

Electrical loading limits, as specified in the PCI Local Bus Specification, Revision 2.1, allow only ten PCI device loads per PCI bus. Therefore, a system that requires more than ten PCI device loads requires a PCI to PCI bridge. For example, in FIG. 1, a maximum of 10 PCI devices 30 may connect to PCI bus 26 and host bridge 22. However, PCI to PCI bridge 38 appears as one device to PCI bus 26 and host bridge 22. This allows option cards 44 that contain further PCI devices 32 to access PCI bus 26 and host bridge 22 maintaining the specified electrical loading limits.

In operation, if PCI device 32 initiates a transaction to memory 18, PCI device 32 is the master and memory 18 is the target. To complete the transaction, PCI device 32 acts as a master along PCI bus 48 to secondary interface 41 of PCI to PCI bridge 39. Then, primary interface 37 of PCI to PCI bridge 39 acts as a master to complete a transaction to secondary interface 40 of PCI to PCI bridge 38. Next, primary interface 36 of PCI to PCI bridge 38 initiates a transaction as master to secondary interface of host bridge 22. Host bridge 22 then acts as master for a transaction to memory 18.

Figure 2:
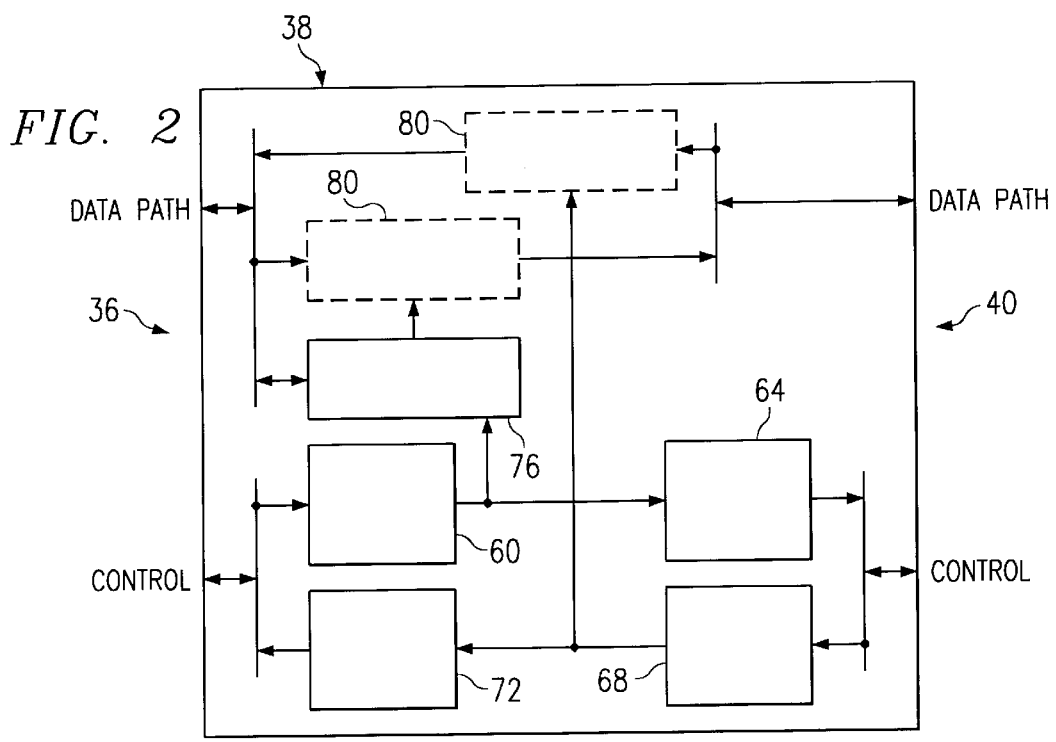
FIG. 2 is a functional block diagram of the typical operation of a PCI to PCI bridge.

FIG. 2 is a functional block diagram of the typical operation of a PCI to PCI bridge indicated generally at 38. Data moving downstream first encounters a primary interface 36. This action initiates a primary target interface 60. PCI to PCI bridge 38 is acting as the target of the transaction that is taking place on the primary bus. Next, a secondary master interface 64 is triggered, in order for PCI to PCI bridge 38 to act as the master of the transaction on the secondary bus. When a transaction moves upstream, a secondary target interface 68 is initiated. PCI to PCI bridge 38 is acting as the target of this transaction that is taking place on the secondary bus. Then a primary master interface 72 is initiated. Here, PCI to PCI bridge 38 acts as the master to the transaction on the primary bus. These transactions are affected by configuration registers 76 that determine the characteristics of PCI to PCI bridge 38. Furthermore, optional data buffers 80 may exist on PCI to PCI bridge 38 to buffer data involved in transactions across PCI to PCI bridge 38.

Figure 3:
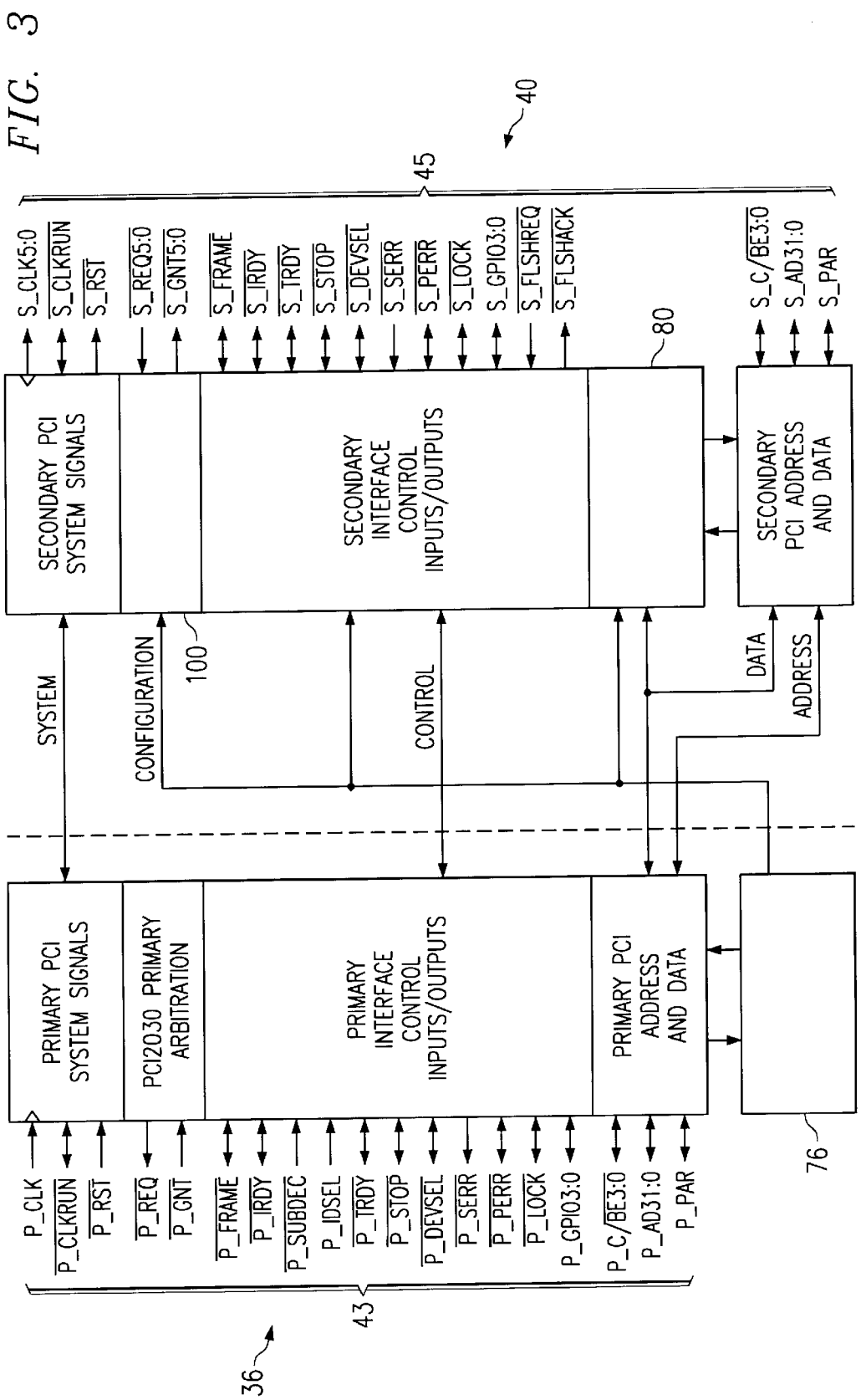
FIG. 3 is a functional block diagram of one embodiment of a PCI to PCI bridge that contains a secondary PCI bus internal arbiter according to the present invention.

FIG. 3 is a functional block diagram of one embodiment of a PCI to PCI bridge that contains a secondary PCI bus internal arbiter according to the present invention. PCI to PCI bridge, indicated generally at 38, contains a primary interface 36 and a secondary interface 40. Primary pinouts 43 comprise the signals that interact with the primary bus on primary interface 36. Secondary pinouts 45 contain the signals that interface with the secondary bus and secondary interface 40. Secondary interface 40 also contains pinouts 45 that interact with a secondary PCI bus internal arbiter 100. PCI to PCI bridge 38 of this embodiment also contains configuration registers 76 and data buffers 80. In operation, PCI to PCI bridge 38 interprets the signals on primary pinouts 43 and secondary pinouts 45 in order to transmit transactions upstream and downstream.

If more than one device on the secondary bus desires to access secondary interface 40, secondary PCI bus internal arbiter 100 determines which device may use PCI to PCI bridge 38. In one embodiment, internal arbiter 100 implements a two tier arbitration scheme, with a high tier and a low tier, as described below.

FIG. 4 is a diagram of one embodiment of a bridge arbitration register of a PCI to PCI bridge with a two tier internal arbitration mechanism according to the present invention. The embodiment contemplates a system whereby the PCI to PCI bridge may service up to six PCI devices that are on the secondary bus. Including the PCI to PCI bridge, there are seven devices that may access the secondary bus. Bits 0–6 allow the user to categorize each device in one of the two tiers. As FIG. 4 shows, the default for this embodiment places the PCI to PCI bridge in the higher priority tier while all other devices are in the lower priority tier.

Such a two tier arbitration scheme presents a problem when a device in the low tier initiates but does not complete a transaction across the PCI to PCI bridge. That is, a master device accessed the secondary bus and indicated to the PCI to PCI bridge that the PCI to PCI bridge needs to access the primary bus and initiate a transaction with a device located on the primary bus. However, the PCI to PCI bridge was unable to complete the transaction on the primary bus. Where the PCI to PCI bridge can only handle one transaction at a time on the primary bus, the incomplete transaction is pending. Therefore, the PCI to PCI bridge informs the master device to retry the attempted transaction. Furthermore, since the PCI to PCI bridge has not completed the first transaction, it must tell any other device that attempts a transaction to also retry. However, in a simple two tier arbitration scheme, the initial master device, if it is in the low tier, must wait until all the high priority devices have had an opportunity to access the bus and then each low priority device in sequence has an opportunity to access the secondary bus. Even when the PCI to PCI bridge completes the transaction on the primary bus, it must wait until the master device again has an opportunity to access the secondary bus to complete the transaction. Because the master device is in the low tier, this can result in significant non-utilization of the PCI to PCI bridge.

Figure 5:
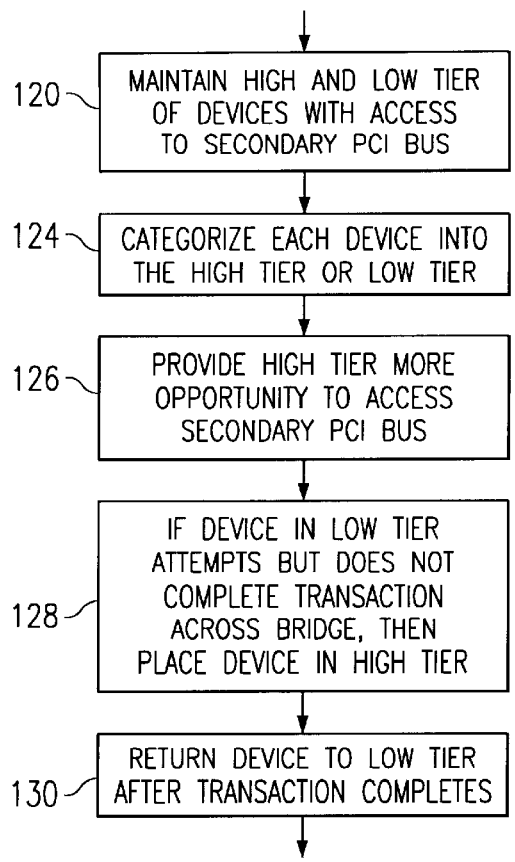
FIG. 5 is a flow chart of one embodiment of a method of a two tier intelligent bus arbitration scheme according to the present invention.

FIG. 5 is a flow chart of one embodiment of a method of a two tier intelligent bus arbitration scheme according to the present invention. This methodology resides inside internal arbiter 100. In step 120, a high and low tier of devices with access to a secondary PCI bus is maintained. Next, at step 124, each device with access to the secondary bus is categorized into either the high tier or the low tier. Then at step 126, access to the secondary bus is provided such that the devices in the high tier have more opportunities than devices in the low tier to access the secondary bus. Next at step 128, it is determined that if a device in the low tier attempts but cannot complete a transaction over the PCI to PCI bridge, the device is placed into the high tier. At step 130, after the transaction completes, the device is placed back into the low tier. In operation, this method determines that when a device in the low tier must have access to the secondary bus such that it can complete a transaction that is pending on the primary bus, that device is placed into the high tier in order to allow the transaction to complete more quickly.

Figure 6A:
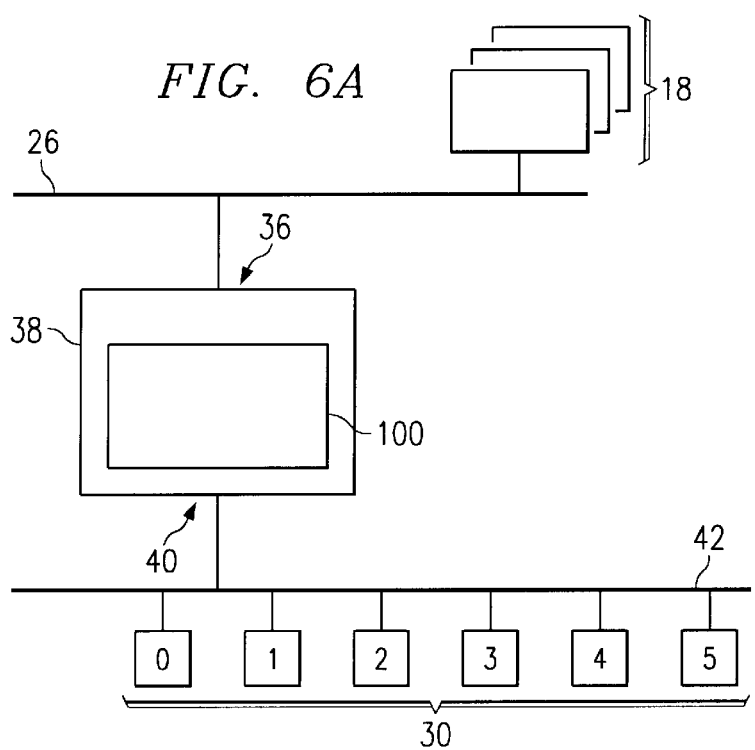
FIGS. 6A, 6B, 6C, and 6D are diagrams showing one embodiment of the operation of a two tier intelligent bus arbitration scheme.

FIGS. 6A, 6B, 6C, and 6D are diagrams showing one embodiment of the operation of a two tier intelligent bus arbitration scheme. FIG. 6A shows a typical placement of a PCI to PCI bridge. Memory 18 resides on PCI primary bus 26 which connects to primary interface 36 of PCI to PCI bridge 38. PCI to PCI bridge 38 contains secondary PCI bus internal arbiter 100. PCI to PCI bridge 38 has a secondary interface 40 which connects to PCI secondary bus 42. PCI devices 30 reside on PCI secondary bus 42. PCI devices 30 are labeled 0, 1, 2, 3, 4, and 5. In operation, when PCI device 0 desires to access memory 18, it can conduct a transaction through PCI to PCI bridge 38. It can do so by first initiating a transaction over PCI secondary bus 42 to secondary interface 40. In this portion of the transaction, PCI to PCI bridge 38 is acting as the target and PCI device 0 is acting as the master. PCI to PCI bridge 38 must in turn act as the master to initiate a transaction over primary interface 36 to primary PCI bus 26 in order to gain access to memory 18. In this embodiment, PCI to PCI bridge 38 only conducts one such transaction at a time. If PCI to PCI bridge 38 is conducting this transaction for PCI device 0, then it is unable to transact a similar transaction for any other PCI device. In such a state, PCI to PCI bridge 38 contains a pending transaction. If the transaction is still pending at the end of PCI device 0's opportunity to access PCI secondary bus 42, the transaction will remain pending until PCI device 0 has another opportunity to access PCI secondary bus 42. While this transaction is pending, PCI to PCI bridge 38 of the present invention initiates a two tier intelligent bus arbitration scheme in order to expedite the transaction.

Figure 6B:
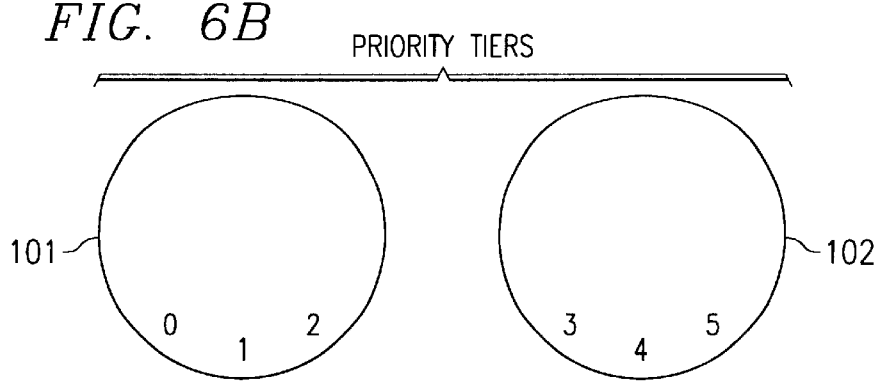

FIG. 6B is a diagram of an operation of a two tier arbitration scheme as implemented by secondary PCI bus internal arbiter 100. There is a high tier 101 and a low tier 102. Each PCI device 0–5 is categorized either into high tier 101 or low tier 012. Each device 0–5 has an opportunity to access secondary PCI bus 42 in the following manner. First, each device in high tier 101 has an opportunity to access secondary PCI bus 42. Then, one of the devices in low tier 102 has an opportunity to access secondary PCI bus 42. Therefore, if PCI devices 0–5 are categorized as in FIG. 6B, then devices 0–5 have opportunities to access secondary PCI bus 42 in the following order: 0, 1, 2, 3, 0, 1, 2, 4, 0, 1, 2, 5.

Figure 6C:
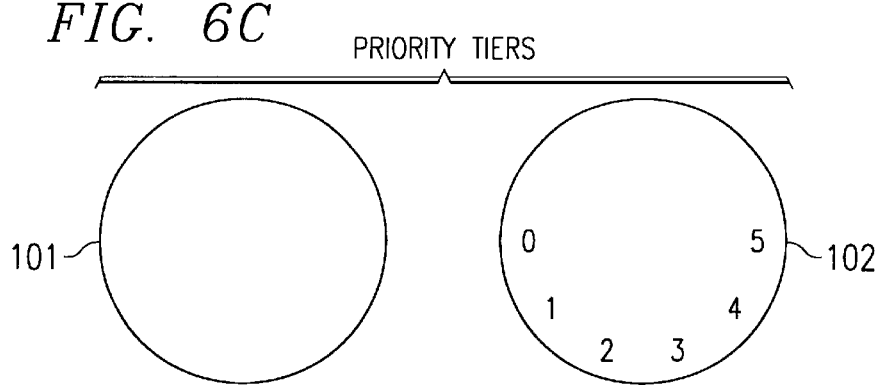

FIG. 6C is a diagram of further operation of a two tier arbitration scheme. FIG. 6C shows a situation whereby PCI devices 0–5 are all initially categorized in low tier 102. Therefore, devices 0–5 have opportunities to access secondary PCI bus 42 in the following order: 0, 1, 2, 3, 4, 5.

Figure 6D:
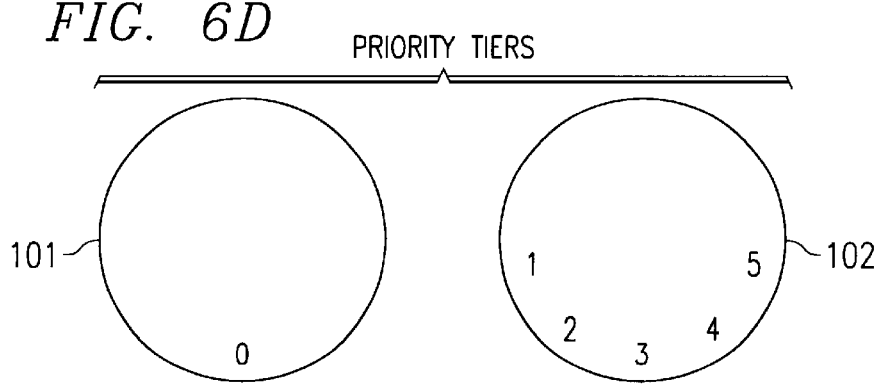

FIG. 6D is a diagram of the operation of an embodiment of an intelligent two tier bus arbitration scheme, according to the present invention. In FIG. 6D, internal arbiter 100 has determined that PCI device 0 has initiated a transaction that is still pending. Therefore, PCI device 0 is moved temporarily into high tier 101. While PCI device 0 is in high tier 101, the opportunity for each device to access secondary PCI bus 42 will follow the order: 0, 1, 0, 2, 0, 3, 0, 4, 0, 5. FIGS. 6C and 6D show that the present embodiment provides more of an opportunity to access secondary PCI bus 42 when secondary PCI bus internal arbiter determines that a low tier device has a pending transaction. Therefore, the pending transaction can be completed more quickly.

FIG. 7 is a diagram of one embodiment of the activity of a PCI to PCI bridge containing a two tier arbitration scheme with and without an intelligent bus arbitration scheme according to the present invention. The top portion of FIG. 7 shows each device 0–5 is in the low tier and thus each device has an equal opportunity to access the secondary bus. This example contemplates that a task initiated by device 0 begins at time A and completes at time C. However, if all devices remain in the low tier, device 0 will not get another opportunity to access the secondary bus until time G. Therefore, the PCI to PCI bridge cannot complete the transaction and cannot process another transaction until time H. The bottom portion of FIG. 7 shows the implementation of a two tier intelligent bus arbitration scheme according to the present invention. Once again, a task initiated by device 0 begins at time A and completes at time C. However, the arbiter has placed 0 in the high tier, thus device 0 has an opportunity to access the secondary bus more frequently. Therefore, the transaction is completed at time C and the bridge is free to process another transaction at time D.

Although the present invention has been described in detail, it should be understood that various changes, substitutions and alterations can be made hereto without departing from the spirit and scope of the invention as defined by the appended claims.

What is claimed is:

1. A method for a multiple tier intelligent bus arbitration scheme for a PCI to PCI bridge, comprising the steps of:

maintaining a first tier and a second tier of devices that have access to a secondary PCI bus;

categorizing each device that has access to the secondary PCI bus into the first tier or the second tier;

providing devices in the first tier more frequent opportunities to gain access to the secondary PCI bus than devices in the second tier;

recognizing a pending transaction when an initiating device in the second tier accesses the secondary PCI bus and attempts a transaction that crosses the PCI to PCI bridge to a primary PCI bus, but the PCI to PCI bridge is unable to complete the transaction on the primary PCI bus, such that the PCI to PCI bridge is unable to provide access to the primary PCI bus to other devices on the secondary bus; and categorizing the initiating device into the first tier until the pending transaction is completed.

2. The method of claim 1 further comprising the step of categorizing the PCI to PCI bridge into the first or second tier as a device with access to the secondary PCI bus.

3. The method of claim 2 further comprising the step of initially placing the PCI to PCI bridge into the first tier.

4. The method of claim 1 whereby the step of categorizing each device with access to the secondary bus comprises categorizing six PCI devices and the PCI to PCI bridge.

5. The method of claim 4 further comprising the step of initially placing the PCI to PCI bridge into the first tier and all other devices into the second tier.

6. A PCI to PCI bridge arbiter with a multiple tier intelligent bus arbitration scheme, comprising:
   an arbiter associated with a PCI to PCI bridge operable to:
   receive from the PCI to PCI bridge information on devices associated with a secondary bus;
   maintain a first tier and a second tier of devices that have access to the secondary PCI bus;
   categorize each device that has access to the secondary PCI bus into the first tier or the second tier;
   provide data to the PCI to PCI bridge such that the PCI to PCI bridge provides devices in the first tier more frequent opportunities to gain access to the secondary PCI bus than devices in the second tier;
   recognize a pending transaction when an initiating device in the second tier accesses the secondary PCI bus and attempts a transaction that crosses the PCI to PCI bridge to primary PCI bus, but the PCI to PCI bridge is unable to complete the transaction on the primary PCI bus, such that the PCI to PCI bridge is unable to provide access to the primary PCI bus to other devices on the secondary bus; and
   categorize the initiating device into the first tier until the pending transaction is completed.

7. The PCI to PCI bridge arbiter of claim 6 whereby the arbiter is further operable to categorize the PCI to PCI bridge into the first or second tier as a device with access to the secondary PCI bus.

8. The PCI to PCI bridge arbiter of claim 7 whereby the arbiter is further operable to initially place the PCI to PCI bridge into the first tier.

9. The PCI to PCI bridge arbiter of claim 6 whereby the arbiter is further operable to categorizes six PCI devices and the PCI to PCI bridge into the first tier or second tier.

10. The PCI to PCI bridge arbiter of claim 9 whereby the arbiter is further operable to initially place the PCI to PCI bridge into the first tier and all other devices into the second tier.

11. A PCI to PCI bridge with a multiple tier intelligent bus arbitration scheme, comprising:
    a primary bus interface operable to communicate with PCI devices associated with a primary bus;
    a secondary bus interface associated with the primary bus interface and operable to communicate with PCI devices associated with a secondary bus;
    a secondary PCI bus internal arbiter associated with the secondary bus interface operable to:
    maintain a first tier and a second tier of devices that have access to the secondary PCI bus;
    categorize each device that has access to the secondary PCI bus into the first tier or the second tier;
    provide devices in the first tier more frequent opportunities to gain access to the secondary PCI bus than devices in the second tier;
    recognize a pending transaction when an initiating device in the second tier accesses the secondary PCI bus and attempts a transaction that crosses the PCI to PCI bridge to the primary PCI bus, but the PCI to PCI bridge is unable to complete the transaction on the primary PCI bus, such that the PCI to PCI bridge is unable to provide access to the primary PCI bus to other devices on the secondary bus; and
    categorize the initiating device into the first tier until the pending transaction is completed.

12. The PCI to PCI bridge of claim 11 whereby the secondary PCI bus internal arbiter is further operable to categorize the PCI to PCI bridge into the first or second tier as a device with access to the secondary PCI bus.

13. The PCI to PCI bridge of claim 12 whereby the secondary PCI bus internal arbiter is further operable to initially place the PCI to PCI bridge into the first tier.

14. The PCI to PCI bridge of claim 11 whereby the secondary PCI bus internal arbiter is further operable to categorize six PCI devices and the PCI to PCI bridge into the first tier or second tier.

15. The PCI to PCI bridge of claim 14 whereby the secondary PCI bus internal arbiter is further operable to initially place the PCI to PCI bridge into the first tier and all other devices into the second tier.

16. The PCI to PCI bridge of claim 11 wherein the first tier is a high tier and the second tier is a low tier.

* * * * *